(12) United States Patent
Akiyoshi

(10) Patent No.: US 9,645,863 B2
(45) Date of Patent: *May 9, 2017

(54) IMAGE FORMING DEVICE, INFORMATION PROCESSING METHOD, AND INFORMATION PROCESSING PROGRAM

(71) Applicant: RICOH COMPANY, LTD., Tokyo (JP)

(72) Inventor: Kunihiro Akiyoshi, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 224 days.

This patent is subject to a terminal disclaimer.

(21) Appl. No.: 13/886,578

(22) Filed: May 3, 2013

(65) Prior Publication Data

US 2013/0247074 A1    Sep. 19, 2013

Related U.S. Application Data

(63) Continuation of application No. 12/108,804, filed on Apr. 24, 2008, now Pat. No. 8,448,193.

(30) Foreign Application Priority Data

Apr. 27, 2007  (JP) ................................ 2007-120216
Mar. 25, 2008  (JP) ................................ 2008-078312

(51) Int. Cl.
*G06F 9/54* (2006.01)
*G03G 15/00* (2006.01)
(Continued)

(52) U.S. Cl.
CPC ............. *G06F 9/541* (2013.01); *G03G 15/50* (2013.01); *H04N 1/00244* (2013.01);
(Continued)

(58) Field of Classification Search
None
See application file for complete search history.

(56) References Cited

U.S. PATENT DOCUMENTS 5,752,032 A    5/1998 Keller et al.
6,430,570 B1   8/2002 Judge et al.
(Continued)

FOREIGN PATENT DOCUMENTS

EP    0 630 145     12/1994
JP    11-282686     10/1999
(Continued)

OTHER PUBLICATIONS

Japanese Office Action mailed on Jan. 4, 2012, issued for JP Application No. 2008-078312 filed on Mar. 25, 2008.
(Continued)

*Primary Examiner* — Shih-Wei Kraft
(74) *Attorney, Agent, or Firm* — Oblon, McClelland, Maier & Neustadt, L.L.P.

(57) ABSTRACT

In an image forming device which is capable of executing an application program, a plurality of interface providing units are arranged each providing the application program with an interface which enables the application program to use a function of the image forming device. A selecting unit selects at least one of the plurality of interface providing units as an object of use for the application program based on a result of comparison of information stored in a storage device and indicating an execution environment of each of the plurality of interface providing units with information stored in the storage device and indicating an execution environment of the image forming device.

13 Claims, 13 Drawing Sheets

(51) Int. Cl.
*H04N 1/00* (2006.01)
*H04N 1/32* (2006.01)

(52) U.S. Cl.
CPC ..... *H04N 1/00973* (2013.01); *H04N 1/32523* (2013.01); *H04N 1/32539* (2013.01); *H04N 1/32561* (2013.01); *H04N 1/32571* (2013.01); *H04N 2201/0039* (2013.01); *H04N 2201/0094* (2013.01)

(56) References Cited

U.S. PATENT DOCUMENTS

| | | |
|---|---|---|
| 6,546,477 B1 | 4/2003 | Russo et al. |
| 6,587,735 B1 | 7/2003 | Yaguchi |
| 6,785,881 B1 | 8/2004 | Bartz et al. |
| 2003/0214666 A1 | 11/2003 | Osada |
| 2003/0215256 A1 | 11/2003 | Osada |
| 2004/0109188 A1 | 6/2004 | Akiyoshi et al. |
| 2004/0111709 A1 | 6/2004 | Furst et al. |
| 2004/0218208 A1 | 11/2004 | Akiyoshi et al. |
| 2004/0255263 A1 | 12/2004 | Ando |
| 2004/0258429 A1 | 12/2004 | Moroi |
| 2005/0066326 A1 | 3/2005 | Herbeck et al. |
| 2005/0100211 A1 | 5/2005 | Gibson et al. |
| 2005/0102448 A1 | 5/2005 | Doshi et al. |
| 2005/0235124 A1 | 10/2005 | Pomaranski et al. |
| 2005/0235218 A1 | 10/2005 | Osada |
| 2005/0257199 A1* | 11/2005 | Johansson ........... G06F 11/3447 717/126 |
| 2006/0077414 A1 | 4/2006 | Lum et al. |
| 2006/0112219 A1 | 5/2006 | Chawla et al. |
| 2006/0174055 A1 | 8/2006 | Flynn |
| 2006/0222176 A1 | 10/2006 | Ohishi |
| 2007/0008583 A1 | 1/2007 | Araki |
| 2007/0019229 A1 | 1/2007 | Matsuhara |
| 2007/0053021 A1 | 3/2007 | Osari et al. |
| 2007/0067325 A1 | 3/2007 | Weitzner et al. |
| 2007/0169089 A1 | 7/2007 | Bantz et al. |
| 2007/0169128 A1 | 7/2007 | Kanamaru et al. |
| 2007/0174818 A1 | 7/2007 | Pasula |
| 2008/0055625 A1 | 3/2008 | Akiyoshi et al. |
| 2008/0091815 A1 | 4/2008 | Rao |
| 2008/0098389 A1 | 4/2008 | Akiyoshi et al. |
| 2008/0276262 A1 | 11/2008 | Munshi et al. |
| 2009/0125911 A1 | 5/2009 | Lazarus |

FOREIGN PATENT DOCUMENTS

| | | |
|---|---|---|
| JP | 2002-99430 | 4/2002 |
| JP | 2004-127280 | 4/2004 |
| JP | 2004-127281 | 4/2004 |
| JP | 2004-129246 | 4/2004 |
| JP | 2004-265300 | 9/2004 |
| JP | 2005-107590 | 4/2005 |
| JP | 2005-269619 | 9/2005 |
| JP | 2006-79294 | 3/2006 |
| JP | 2006-164142 | 6/2006 |
| JP | 2006-319993 | 11/2006 |
| JP | 2007-35049 | 2/2007 |

OTHER PUBLICATIONS

Office Action issued Oct. 2, 2012, in Japanese Patent Application No. 2008-078312.

U.S. Appl. No. 13/907,384, filed May 31, 2013.

* cited by examiner

FIG.3

| MAJOR CLASS | SCAN, PRINT, FAX, etc. |
|---|---|
| MIDDLE CLASS | COLOR/MONOCHROME, SHEET SIZE, etc. |
| MINOR CLASS | RESOLUTION, DOUBLE-SIDED, etc. |

FIG.4

| |
|---|
| AVAILABLE MEMORY SPACE |
| SERVICE MODULES TO BE EXECUTED CONCURRENTLY |
| CPU PERFORMANCE (CLOCK SPEED, etc.) |
| SPEED PRIORITY/MEMORY SAVING PRIORITY |
| SERVICE MODULE TO BE REPLACED |

FIG.10

| SERVICE ID | 0x00010001 | | |
|---|---|---|---|
| PROVISION FUNCTION INFORMATION | CLASS | SCAN | |
| | ATTRIBUTE | COLOR MODE | COLOR, MONOCHRO |
| | | COMP. METHOD | MR, MMR, MH, JPEG |
| | | FILE FORMAT | tiff, jpeg |
| | | RESOLUTION | 200, 300, 400, 600 |
| | | SHEET SIZE | A3, A4, B4, B5 |
| | | ADF | DOUBLE-SIDED |
| EXECUTION CONDITION INFORMATION | USE MEMORY | 500Kb | |
| | PERFORMANCE | 1 (SHEET/SEC) | |

FIG.11

| SERVICE ID | 0x00010002 | | |
|---|---|---|---|
| PROVISION FUNCTION INFORMATION | CLASS | SCAN | |
| | ATTRIBUTE | COLOR MODE | COLOR |
| | | COMP. METHOD | MR, MMR, MH |
| | | FILE FORMAT | tiff |
| | | RESOLUTION | 200, 300 |
| | | SHEET SIZE | A4 |
| | | ADF | SINGLE-SIDE |
| EXECUTION CONDITION INFORMATION | USE MEMORY | 200Kb | |
| | PERFORMANCE | 0.5 (SHEETS/SEC) | |

FIG.12

| SERVICE ID | 0x00020001 | | |
|---|---|---|---|
| PROVISION FUNCTION INFORMATION | CLASS | PRINT | |
| | ATTRIBUTE | COLOR MODE | COLOR, MONOCHRO |
| | | SHEET SIZE | A3, A4, B4, B5 |
| EXECUTION CONDITION INFORMATION | USE MEMORY | 400Kb | |
| | PERFORMANCE | 1 (SHEET/SEC) | |

FIG.13

| USE FUNCTION | ATTRIBUTE ITEM | USE ATTRIBUTE VALUE |
|---|---|---|
| SCAN | COLOR MODE | COLOR |
|  | SHEET SIZE | A4 |
|  | RESOLUTION | 300 |
|  | ADF | SINGLE-SIDE |
|  | COMP. METHOD | MH, MR, MMR |
|  | FORMAT | tiff |
|  | SERVICE EXECUTED CONCURRENTLY | FAX RECEIVING |
| PRINT | COLOR MODE | COLOR |
|  | SHEET SIZE | A3, A4 |
|  | SERVICE EXECUTED CONCURRENTLY | FAX RECEIVING |
| FAX RECEIVING | SERVICE EXECUTED CONCURRENTLY | SCAN, PRINT |

IMAGE FORMING DEVICE, INFORMATION PROCESSING METHOD, AND INFORMATION PROCESSING PROGRAM

CROSS-REFERENCE TO RELATED APPLICATIONS

This application is a Continuation of U.S. application Ser. No. 12/108,804, filed Apr. 24, 2008, which is based on and claims the benefit of priority of Japanese patent application No. 2007-120216, filed on Apr. 27, 2007, and Japanese patent application No. 2008-078312, filed on Mar. 25, 2008, the contents of which are incorporated herein by reference in their entirety.

BACKGROUND OF THE INVENTION

1. Field of the Invention

This invention relates to an image forming device, an information processing method, and an information processing program which are capable of executing an application program.

2. Description of the Related Art

In recent years, there is an image forming device (called a multi-function peripheral) which is provided with an API (application programming interface) for making use of functions of the image forming device. The image forming device is capable of executing an application program which was developed using the API. For example, see Japanese Laid-Open Patent Application No. 2005-269619.

Generally, the functions of image forming device vary depending on the model of the image forming device. If the function difference is reflected in the API as it is, the software developers have to develop application programs for every model. To avoid this, abstract concepts of the functions of image forming device are expressed in the API, in order to reduce the model dependency of the API and facilitate the deployment of application programs, developed using the API, to two or more models of image forming device.

However, even if the function difference is absorbed in the API, the difference in the execution environment exists apart from the function difference. For example, the memory resources and CPU performance may vary depending on the model. And even if two image forming devices are of the same model, they may differ in the number of application programs installed or the presence of add-on memory.

Therefore, in order to realize the maximum performance using the limited resources of the application-incorporated system, implementation of the logics in conformity with the actual execution environment is demanded for the module which is called through the API (which module is called "service module"). A conceivable method of increasing the performance is to implement the logics in conformity with various execution environments in the same service module. However, this method has the following problems.

First, the program size of the service module is enlarged and the amount of the memory consumed at a time of loading the programs on the memory (RAM) is increased. Second, the work area (the heap area, etc.) that is not used actually is secured on the memory, which may increase the amount of the memory consumed excessively.

These problems are very important for the image forming device in which several application programs are incorporated and the available memory space is more limited than a general-purpose computer. For this reason, it is desired to provide a plurality of service modules which provide the same function with the same API in accordance with the execution environment. However, it is not desirable that the operator is caused to make a decision on which service module is suitable for the execution environment of the image forming device, which will lower the ease of operation of the image forming device.

SUMMARY OF THE INVENTION

In one aspect of the invention, the present disclosure provides an improved image forming device in which the above-described problems are eliminated.

In one aspect of the invention, the present disclosure provides an image forming device and an information processing method which enable an application program to use a suitable software module among a plurality of software modules which provide the functions used by the application program.

In an embodiment of the invention which solves or reduces one or more of the above-mentioned problems, the present disclosure provides an image forming device which is capable of executing an application program, the image forming device comprising: a plurality of interface providing units each providing the application program with an interface which enables the application program to use a function of the image forming device; and a selecting unit selecting at least one of the plurality of interface providing units as an object of use for the application program based on a result of comparison of information stored in a storage device and indicating an execution environment of each of the plurality of interface providing units with information stored in the storage device and indicating an execution environment of the image forming device.

In an embodiment of the invention which solves or reduces one or more of the above-mentioned problems, the present disclosure provides an information processing method for use in an image forming device capable of executing an application program, the information processing method comprising the steps of: arranging a plurality of interface providing units each providing the application program with an interface which enables the application program to use a function of the image forming device; and selecting at least one of the plurality of interface providing units as an object of use for the application program based on a result of comparison of information stored in a storage device and indicating an execution environment of each of the plurality of interface providing units with information stored in the storage device and indicating an execution environment of the image forming device.

According to the embodiments of the invention, it is possible to provide an image forming device and an information processing method which enable an application program to use a suitable software module among a plurality of software modules which provide the functions used by the application program.

BRIEF DESCRIPTION OF THE DRAWINGS

Other objects, features and advantages of the invention will be apparent from the following detailed description when reading in conjunction with the accompanying drawings.

FIG. 3 is a diagram showing the composition of provision function information.

FIG. 4 is a diagram showing the composition of execution condition information.

FIG. 10 is a diagram showing a first example of service module information.

FIG. 11 is a diagram showing a second example of service module information.

FIG. 12 is a diagram showing a third example of service module information.

FIG. 13 is a diagram showing an example of use function information.

DETAILED DESCRIPTION OF PREFERRED EMBODIMENTS

A description will be given of embodiments of the invention with reference to the accompanying drawings.

Figure 1:
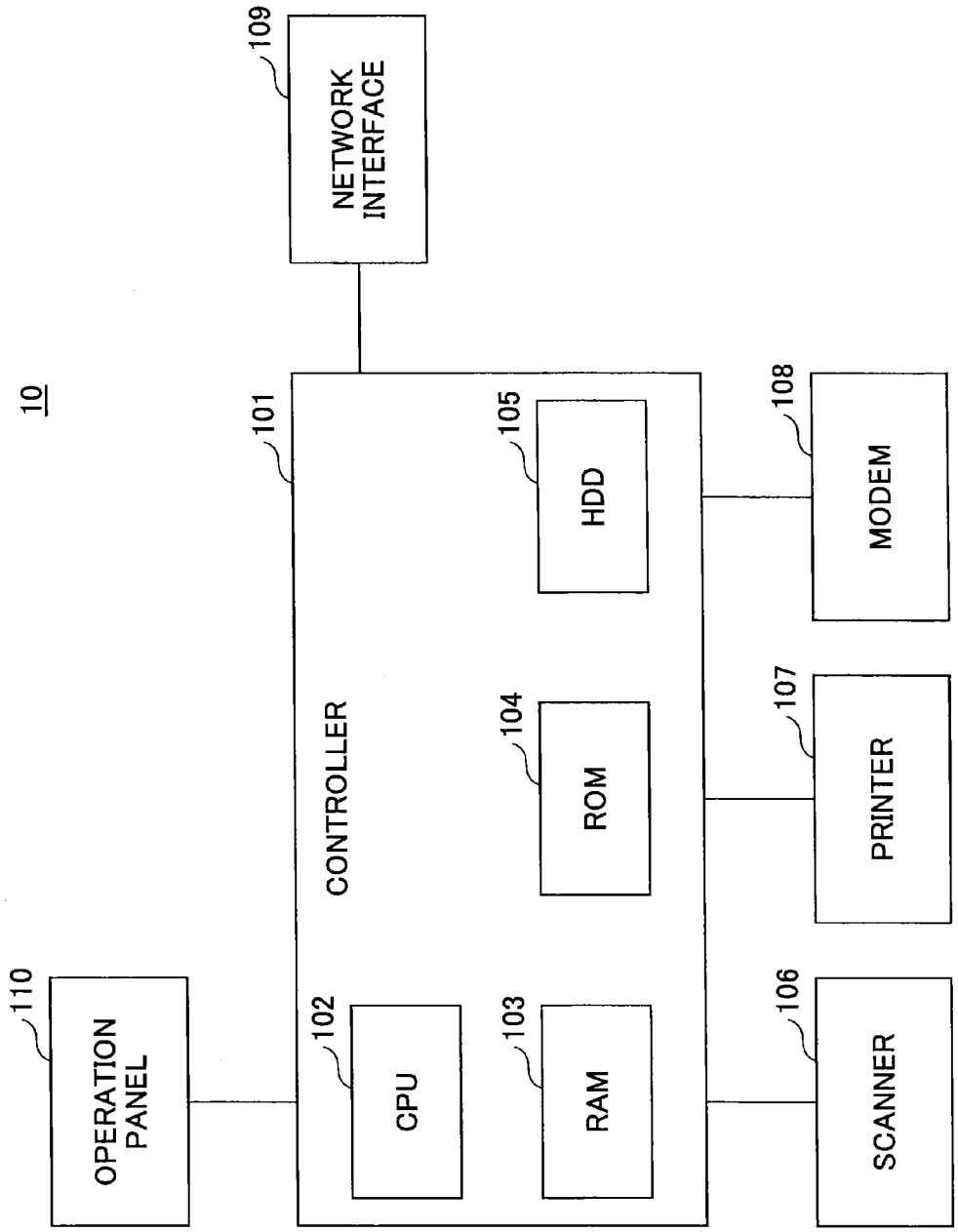
FIG. 1 is a diagram showing the hardware composition of an image forming device in an embodiment of the invention.

FIG. 1 shows the hardware composition of an image forming device in an embodiment of the invention. As shown in FIG. 1, the image forming device 10 is an example of electronic equipment. Typically, the image forming device 10 is a multi-function peripheral. The hardware of the image forming device 10 includes a controller 101, a scanner 106, a printer 107, a modem 108, a network interface 109, and an operation panel 110.

The controller 101 includes a CPU 102, a RAM 103, a ROM 104, and a HDD 105. In the ROM (read-only memory) 104, various kinds of programs and data used by the programs are stored. The RAM (random access memory) 103 is used as a memory region for loading a program, or a work area of the loaded program, etc. The CPU (central processing unit) 102 processes the program loaded on the RAM 103 to realize the function which will be described later. The HDD (hard disk drive) 105 is used as a storage region for storing the data, such as image data, which is generated by the execution of the program. In the HDD 105, programs which may be installed or uninstalled, and data used by the programs are also stored.

The scanner 106 is the hardware for reading image data from a document. The printer 107 is the hardware for printing image data on a copy sheet. The modem 108 is the hardware for connecting the image forming device 10 with a telephone line, and this modem 108 is used in order to perform the facsimile transmission and reception of image data via the telephone line.

The network interface 109 is the hardware for connecting the image forming device 10 with a network, such as LAN (local area network). The network may be a wireless communication network or a wired communication network.

The operation panel 110 is the hardware which is provided with a set of buttons, a liquid crystal panel, etc., which is adapted for receiving the inputs from the user and for providing operational information to the user.

Figure 2:
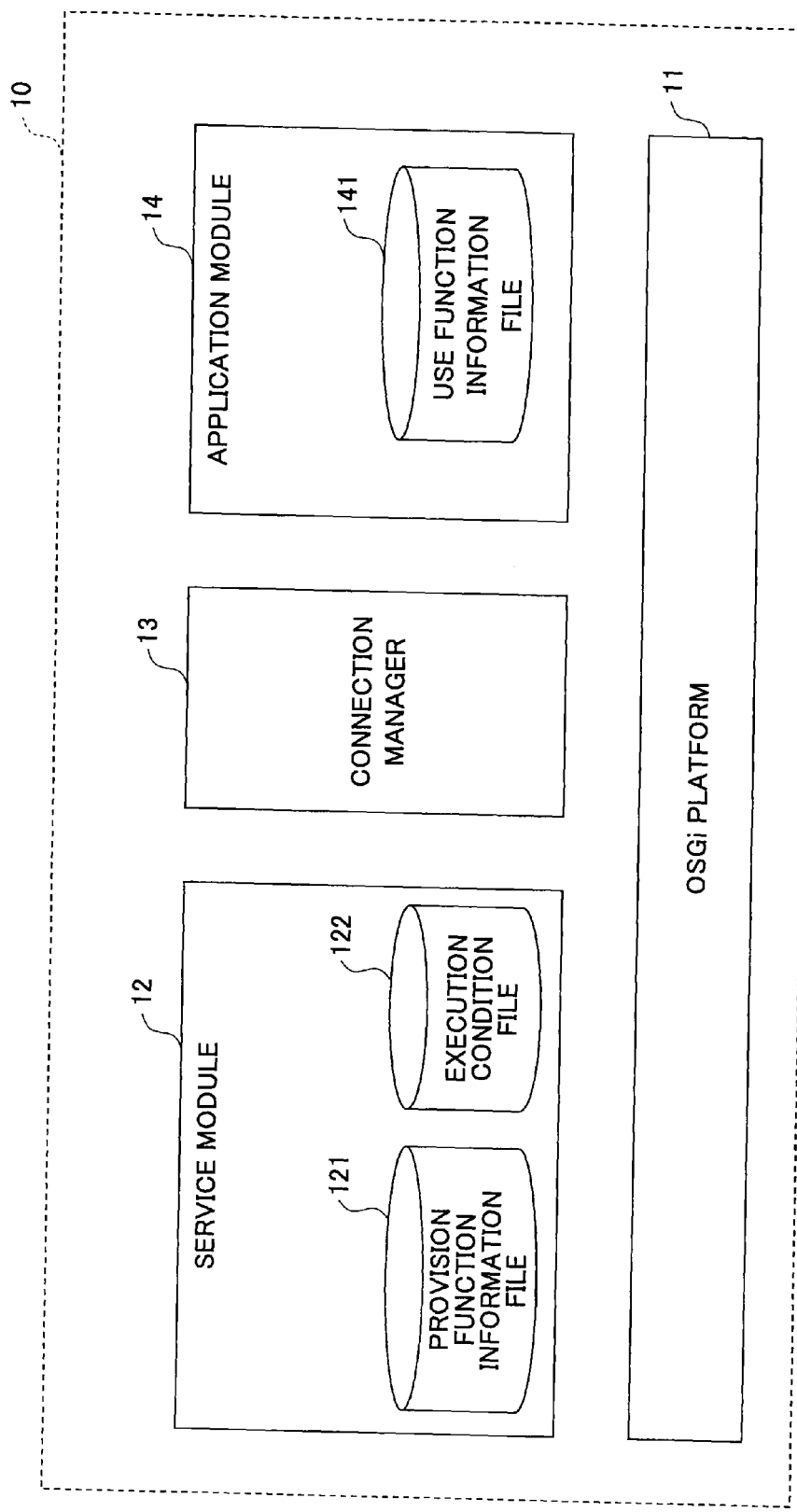
FIG. 2 is a diagram showing the software composition of an image forming device in an embodiment of the invention.

FIG. 2 shows the software composition of an image forming device in an embodiment of the invention. As shown in FIG. 2, the software (programs) of the image forming device 10 includes an OSGi platform 11, a service module 12, a connection manager 13, and an application module 14. When these items of the software are executed by the CPU 102 of the image forming device 10, the items of the software cause the CPU 102 to perform the functions of the image forming device 10.

The OSGi (open services gateway initiative) platform 11 is the standardized technology offered by the OSGi Alliance. The OSGi platform 11 is a software platform which provides an execution environment for Java™ based software components (software modules) created based on the open software component technology. The Java™ based software is mounted in the form of software components called "bundles" on the OSGi platform 11. Each bundle is constituted by a single JAR (Java archiver) file and the respective bundles can be installed independently of each other.

The service module 12 provides an interface (API) to which the function of the image forming device 10 is abstracted. The service module 12 is a bundle which provides the service of performing the function, in response to a call of the interface. Two or more instances of the service module 12 may exist in the image forming device 10 depending on the content of the service to be provided, the version of the service, and an appropriate execution environment (for example, performance of the image forming device 10) for the service. For example, two or more service modules 12 may exist in which the interfaces and the content of the services are shared or overlapped. As shown in FIG. 2, a provision function information file 121 and an execution condition file 122 are provided in each of the service modules 12. In other words, a provision function information file 121 and an execution condition file 122 are associated with each service module 12.

The provision function information file 121 is a file in which the information (provision function information) for identifying the function provided by a corresponding service module 12 is stored. FIG. 3 is a diagram showing the composition of the provision function information.

As shown in FIG. 3, the provision function information is classified in a hierarchical structure, including major class, middle class, and minor class. As for the major class, an identifier (identification information) of the function among the image forming device functions classified as major classes, such as scan, print, fax, etc, which is provided by the corresponding service module 12 is specified as the major class. As for the middle class, the identifiers (identification information) of the functions considered the attributes of the major class function, such as, color/monochrome, applicable paper size, etc., which are provided by the corresponding service module 12 are specified as the middle class. The items (functions) which can be specified as the middle class may vary depending on the value which is specified as the major class. As for the minor class, the identifiers (identification information) of the functions considered as more detailed attributes of the major class function, such as resolution, double-sided printing, etc., which are provided by the corresponding service module 12 are specified as the minor class. The items (functions) which can be specified as the minor class may vary depending on the value which is specified as the major class or the middle class.

The execution condition file 122 is a file in which the information (execution condition information) which describes the execution conditions of the service module 12 is stored. FIG. 4 is a diagram showing the composition of the execution condition information.

As shown in FIG. 4, the execution condition information contains available memory space, service modules to be executed concurrently, CPU performance, speed priority/memory saving priority, service module to be replaced, etc.

The value of the available memory space which is required or recommended for performing the corresponding service module 12 is specified as the available memory space. The identifiers or IDs of service modules 12 which are to be executed concurrently with (or in parallel with) the corresponding service module 12 are specified as the service modules to be executed concurrently. As for the CPU performance, the recommended or minimum CPU performance (clock speed, etc.) required to execute the corresponding service module 12 is specified. As for the speed priority/memory saving priority, the information indicating whether the service module 12 is created according to the speed priority scheme or according to the memory saving priority scheme is specified. For example, when a service module 12 which performs decompression, editing and recompression of a compressed image as a scanning result is created according to the speed priority scheme, a large amount of work memory is secured and a block processing of the image data of one page is performed collectively. On the other hand, when a service module 12 of the same type is created according to the memory saving priority scheme, the image data of one page is divided into a set of image data portions and processing of each image data portion is performed individually. Thus, depending on whether the speed priority scheme or the memory saving priority scheme is used, the content (substance) of the service module 12 which provides the same function varies in the logic. Taking into consideration the above-mentioned situation, the item of speed priority/memory saving priority is provided in the execution condition information. As for the service module to be replaced, the identifier or ID of the existing service module 12 which is compulsorily replaced by the corresponding service module 12 when the corresponding service module 12 is installed is specified.

The provision function information file 121 and the execution condition file 122 are stored in the HDD 105 when the service module 12 is installed. Namely, the provision function information file 121 and the execution condition file 122 are created concurrently with the time of creating the service module 12, and these files are provided in the service module 12. Suppose that the file identifiers of the provision function information file 121 and the execution condition file 122 in this embodiment are arranged to include a specific ID (in the following, called) assigned to the corresponding service module 12. In the following, the specific ID assigned to the corresponding service module 12 is called "service ID". Accordingly, in this embodiment, the corresponding service module 12 can be identified based on the file identifier (namely, based on the service ID contained in the file identifier).

The association between service module 12 and service ID is stored in the HDD 105 separately. The form of description of the provision function information and the execution condition information is not limited to a predetermined form. For example, the provision function information and the execution condition information may be described in XML (extensible markup language).

Referring back to FIG. 2, the software composition of the image forming device 10 will be described again. The application module 14 is a bundle which constitutes an application program directly used by a user. In the following, an application program may be also called an application. The application module 14 uses the function of the image forming device 10 through the interface provided by the service module 12, in order to respond to the demand from the user. Two or more instances of the application module 14 may exist in the image forming device 10 depending on the kind of the application.

A use function information file 141 is provided in each of the application modules 14. In other words, a use function information file 141 is associated with each application module 14.

The use function information file 141 is a file in which the information (use function information) for identifying the function to be used by the corresponding application module 14 is stored. The use function information is defined in the composition that is the same as that of the provision function information mentioned above. The items of the use function information correspond to those of the provision function information. Therefore, the composition of the use function information in this embodiment is the same as shown in FIG. 3.

In the major class of the provision function information usually, one function is specified. Namely, one service module 12 usually provides a single function considered as the major class. On the other hand, in the major class of the use function information usually, two or more functions may be specified. Namely, one application module 14 may use two or more functions considered as the major classes. When two or more major classes are specified, the middle class is specified for every major class and the minor class is specified for every major class or middle class.

In order to allow the application module 14 to use a pertinent service module 12, the connection manager 13 selects a service module 12 which is suitable for the execution environment relevant to the application module 14 and the image forming device 10, based on the provision function information file 121, the execution condition file 122, and the use function information file 141. Then, the connection manager 13 performs the processing for allowing the application module 14 to use the selected service module 12.

Specifically, when two or more service modules 12 which are relevant to the function being used by the application module 14 exist, a suitable service module 12 is chosen from among the two or more service modules 12 by the connection manager 13.

Figure 5:
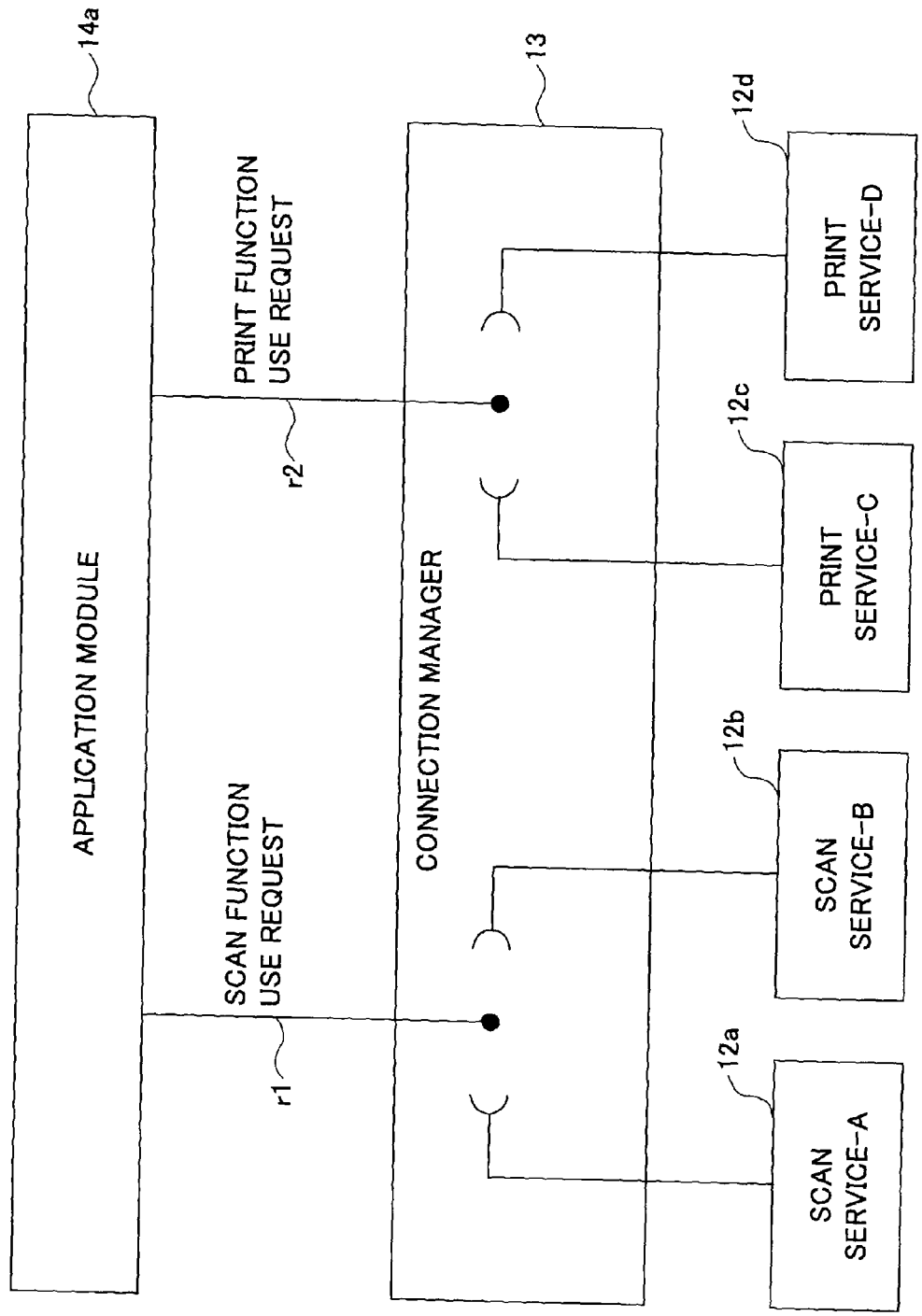
FIG. 5 is a diagram for explaining the function of a connection manager.

FIG. 5 is a diagram for explaining the function of the connection manager 13. As shown in FIG. 5, the application module 14a is an application module 14 which is about to use a scan function and a print function. The application module 14a transmits, to the connection manager 13, a scan function use request r1 (calling of the interface of service module 12 for using a scan function) and a print function use request r2 (calling of the interface of service module 12 for using a print function).

In the example shown in FIG. 5, the connection manager 13 chooses a scan service-A 12a or a scan service-B 12b in response to the scan function use request r1, and chooses a print service-C 12c or a print service-D 12d in response to the print function use request r2. The scan service-A 12a and the scan service-B 12b are service modules 12 which provide a scan function by using the same interface. The print service-C 12c and the print service-D 12d are service modules 12 which provide a print function by using the same interface.

Figure 6:
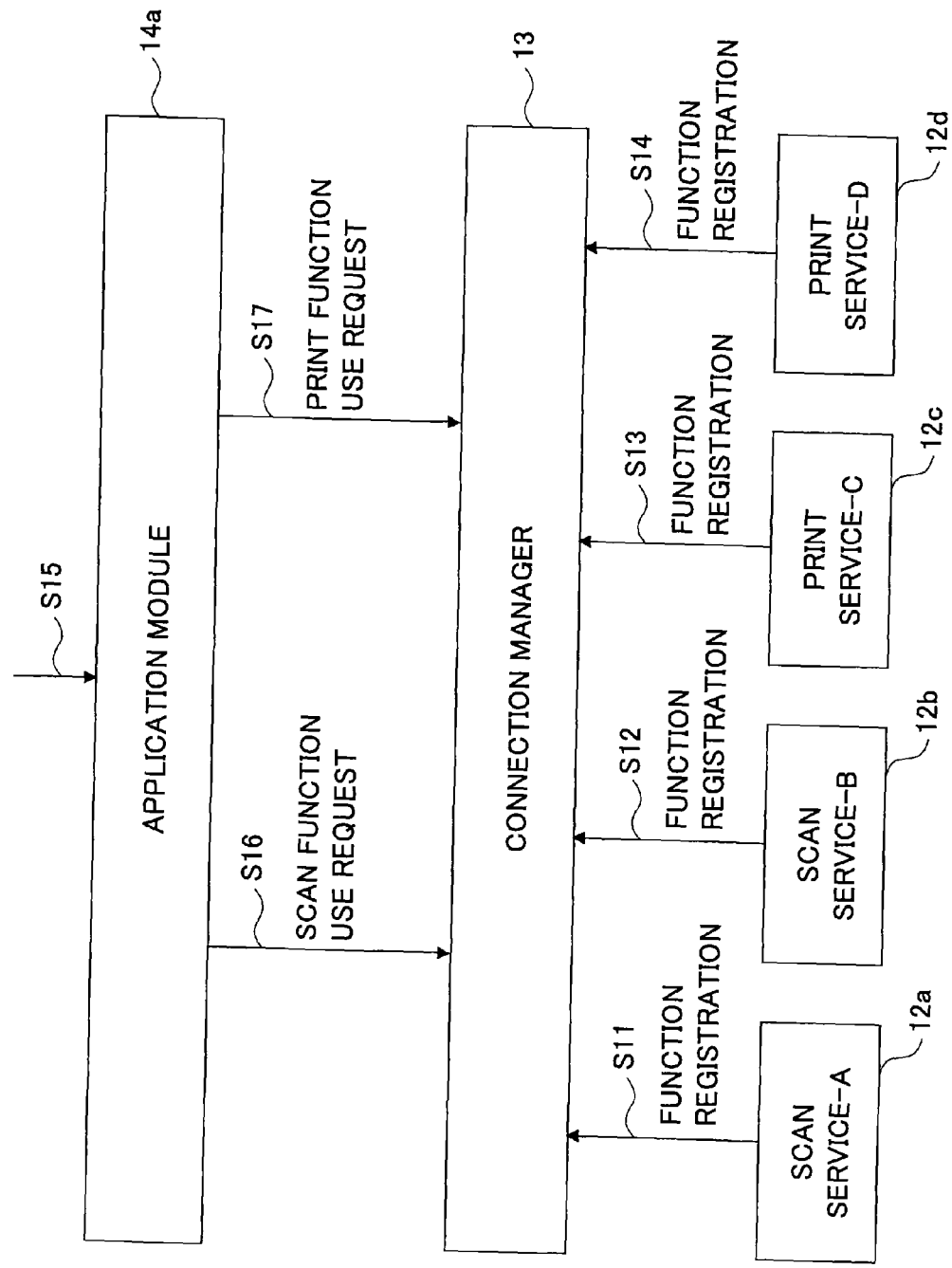
FIG. 6 is a diagram for explaining the process performed by an image forming device in an embodiment of the invention.

Next, the process performed by the image forming device 10 will be explained. FIG. 6 is a diagram for explaining the process performed by an image forming device in an embodiment of the invention. In FIG. 6, the elements which are the same as corresponding elements in FIG. 5 are designated by the same reference numerals, and a description thereof will be omitted.

As shown in FIG. 6, registration of the provision function information stored in the provision function information file 121 and the execution condition information stored in the execution condition file 122 for each of the service modules 12a-12d into the connection manager 13 is carried out beforehand (for example, at the time of installation) (steps S11-S14). The registration in this case means that the connection manager 13 is set in a state in which the connection manager 13 is able to use the provision function information and the execution condition information.

For example, the registration may be carried out by notifying the respective file identifiers of the provision function information file 121 and the execution condition file 122 in each of the service modules 12a-12d to the connection manager 13. This is because the connection manager 13 is able to acquire and use the provision function information and the execution condition information based on the corresponding file identifiers.

Alternatively, if a location (for example, a folder) where the provision function information file 121 and the execution condition file 122 of each service module 12 should be stored is recognized by the connection manager 13 beforehand, the step of storing the provision function information file 121 and the execution condition file 122 of each service module 12 into the location may be performed instead of the above-mentioned steps S11-S14. This is because the connection manager 13 is able to actively acquire and use the provision function information file 121 and the execution condition file 122 from the storage location.

When execution of the application module 14a is requested by the input of the user through, for example, the operation panel 110 (S15), the application module 14a notifies, to the connection manager 13, the storage location (or file identifier) of the use function information file 141 provided therein or the use function information stored in the use function information file 141 (steps S16 and S17).

In this case, it is assumed that the scan function and the print function are included in the use function information of the application module 14a as the major class functions. Therefore, transmitting the above-mentioned notification from the application module 14a to the connection manager 13 is equivalent to sending both the scan function use request (S16) and the print function use request (S17) to the connection manager 13.

The connection manager 13 chooses one of the scan service-A 12a and the scan service-B 12b as the scan function being used, and one of the print service-C 12c and the print service-D 12d as the print function being used, based on the use function information of the application module 14a, the provision function information and the execution condition information of each service module 12. The selected service modules 12 are loaded on the RAM 103, and subsequently the processing is performed in accordance with various kinds of method calls from the application module 14a.

Figure 7:
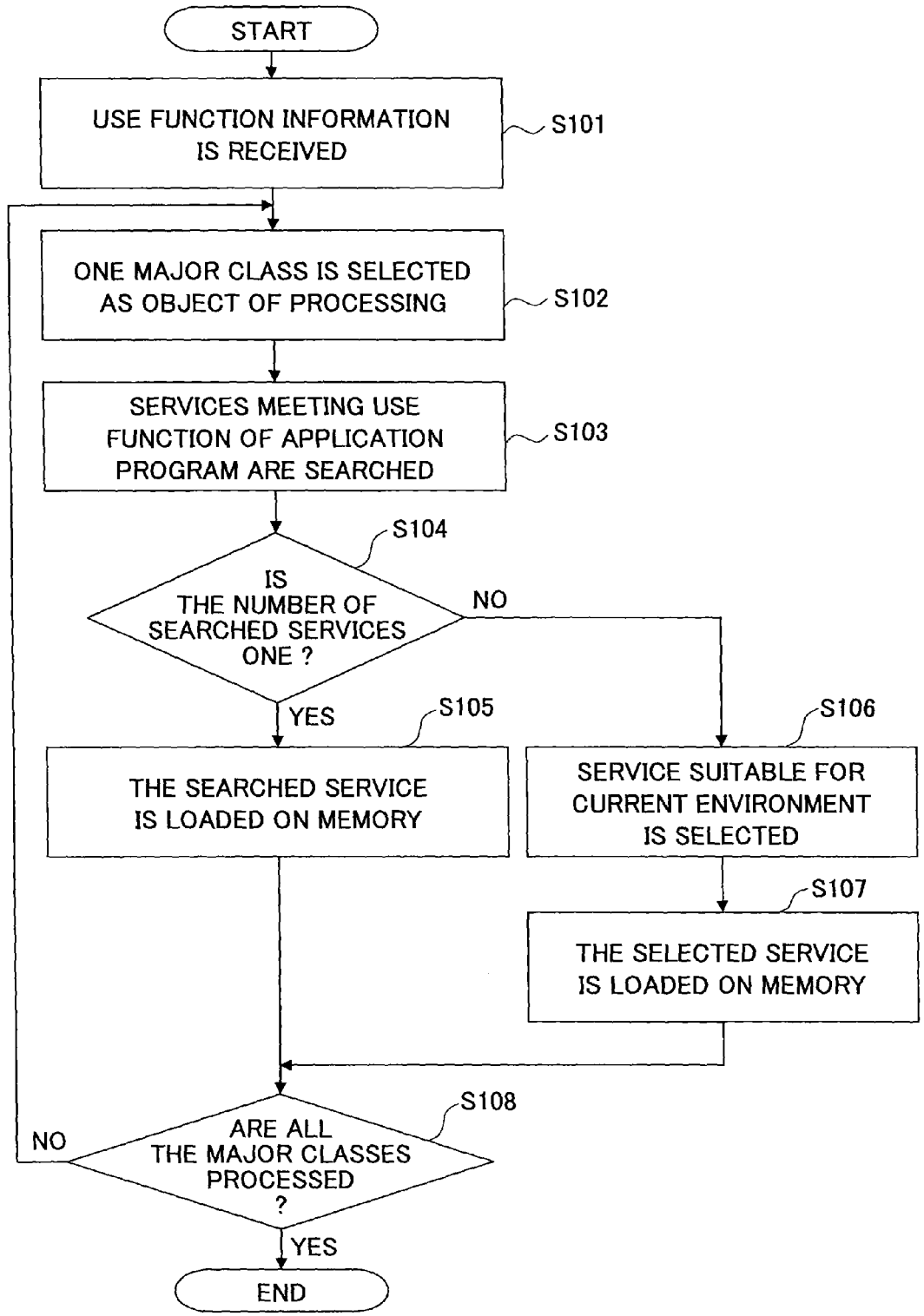
FIG. 7 is a flowchart for explaining a service module selection process performed by the connection manager.

Next, a description will be given of a service module selection process performed by the connection manager. FIG. 7 is a flowchart for explaining a service module selection process performed by the connection manager 13.

In the service module selection process of FIG. 7, when the use function information from the application module 14 is received at the connection manager 13 (S101), the connection manager 13 selects one major class in the use function information as an object of processing (S102).

Subsequently, the connection manager 13 compares the use function information concerning the major class (including the functions indicated by the major class, the functions indicated by the middle class belonging to the major class, and the functions indicated by the minor class belonging to the major class) with the provision function information of the respective service modules 12 (matching), and searches any service modules 12 which include the provision function information meeting the use function information concerning the major class (namely, the service modules 12 can provide all the functions belonging to the major class) (S103).

In this regard, the provision function information meeting the use function information means that it includes all the functions specified as the use function information for all the hierarchical structure including the major class, the middle class, and the minor class. Exact matching between the provision function information and the use function information is also included.

Subsequently, the connection manager 13 determines whether the number of the searched service modules 12 is one (S104). When the number of the searched results is one, the connection manager 13 selects the searched service module 12 as an object of use and loads it on the RAM 103 (S105).

On the other hand, when there are a plurality of searched results at the determination of step S104, the connection manager 13 compares the current execution environment (the available memory space, the information indicating the CPU performance) with the execution condition information of each of the searched service modules 12 (the available memory space, the information indicating the CPU performance), and selects a service module 12 which is most suitable for the current execution environment among the searched service modules 12 (S106).

As for the service module 12 in which the service ID is registered in the item of the service module to be replaced by other service modules, it is omitted from the object of selection. Even if it is selected, such a service module 12 will be replaced by other service modules 12. Therefore, even if the previous service module 12 is not uninstalled, the new service module 12 is automatically selected as the object of use.

As for the item of the speed priority or memory saving priority in the execution condition information, when the available memory space is smaller than a predetermined value, a service module of memory saving priority is selected preferentially, and when the available memory space exceeds the predetermined value, a service module of speed priority is selected preferentially.

However, if speed priority or memory saving priority is clearly specified to the connection manager 13 by the application module 14, the comparison of the item is performed based on the specification by the application module 14.

Subsequently, the connection manager 13 loads the selected service module 12 on the RAM 103 as an object of use (S107).

The processing of the steps S102-S107 is repeated until all the major classes included in the use function information are processed (S108). After all the major classes included in the use function information are processed, the service module selection process of FIG. 7 is terminated.

Figure 8:
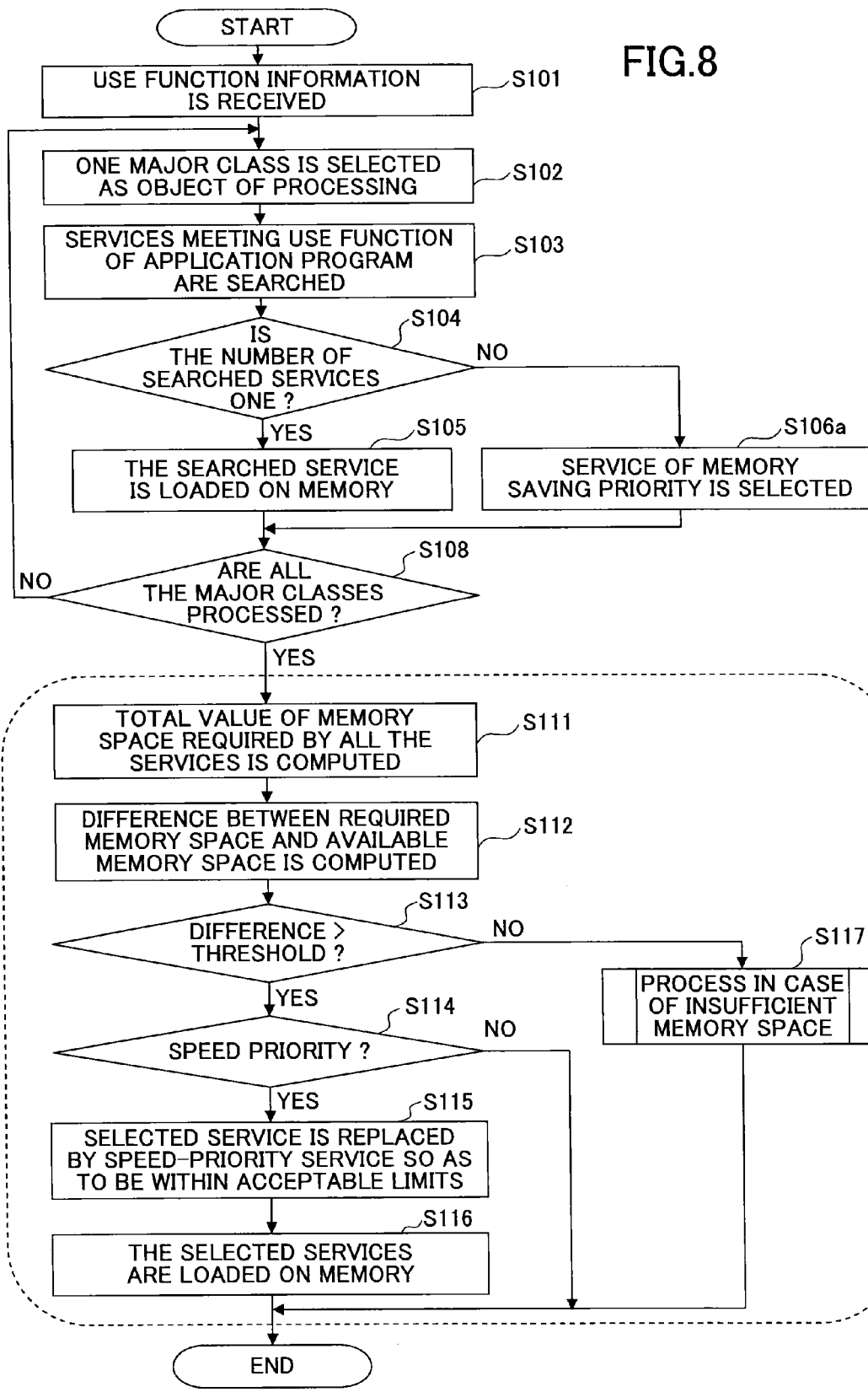
FIG. 8 is a flowchart for explaining a service module selection process performed by the connection manager.

Alternatively, another service module selection process as shown in FIG. 8 may be performed instead of the process of FIG. 7. FIG. 8 is a flowchart for explaining a service module selection process performed by the connection manager 13. In FIG. 8, the steps which are the same as corresponding steps in FIG. 7 are designated by the same reference numerals, and a description thereof will be omitted.

In the service module selection process of FIG. 8, the step S106 shown in FIG. 7 is replaced by step S106a. In step S106a, the connection manager 13 selects preferentially a service module 12 which execution condition information is indicated as being of memory saving priority.

Alternatively, the step S106a may be performed by comparing the available memory space in the execution condition information of each searched service module 12 and selecting a service module 12 which has the smallest value of the available memory space among the searched service modules (or which has a small available memory space required or recommended to perform the service) as an object of use.

In the service module selection process of FIG. 8, the processing of additional steps S111-S117, indicated by the dotted line in FIG. 8, is added after step S108. In FIG. 8, the step S107 shown in FIG. 7 is omitted, and therefore, none of the service modules 12 selected at the step S106a is yet loaded on the RAM 103 at the start point of step S111.

In step S111, the connection manager 13 computes a total value of the available memory spaces of the execution condition information for all the service modules 12 selected as objects of use after the step S108.

Subsequently, the connection manager 13 computes a difference between the available memory space in the current execution environment and the total value computed in the step S111 (=the available memory space of the current execution environment−the computed total value of the available memory spaces) (S112).

Subsequently, the connection manager 13 determines whether the difference is larger than a predetermined threshold (S113).

When the difference is larger than the threshold, the connection manager 13 determines whether the service module is specified as being of speed priority by the application module 14 (S114).

When the service module is specified as being of speed priority, the already selected service module 12 is replaced by the service module 12 of speed priority for the function in which the service module 12 of speed priority exists, such that the resulting memory space falls within the acceptable limits of the available memory space (S115). Namely, the already selected service module 12 is omitted from the object of use and the service module 12 of speed priority is selected as an object of use.

Determination as to whether the resulting memory space is within the acceptable limits of the available memory space may be made before the replacement by comparing the available memory space in the execution condition information of the service module 12 of speed priority and the available memory space in the current execution environment in the process of replacing the already selected service module 12 by the service module 12 of speed priority sequentially.

After the replacement is completed, all the service modules 12 selected as objects of use at this time are loaded on the RAM 103 (S116).

On the other hand, when it is determined at the step S113 that the difference is not larger than the threshold, the connection manager 13 performs processing in case of insufficient memory space (S117).

Figure 9:
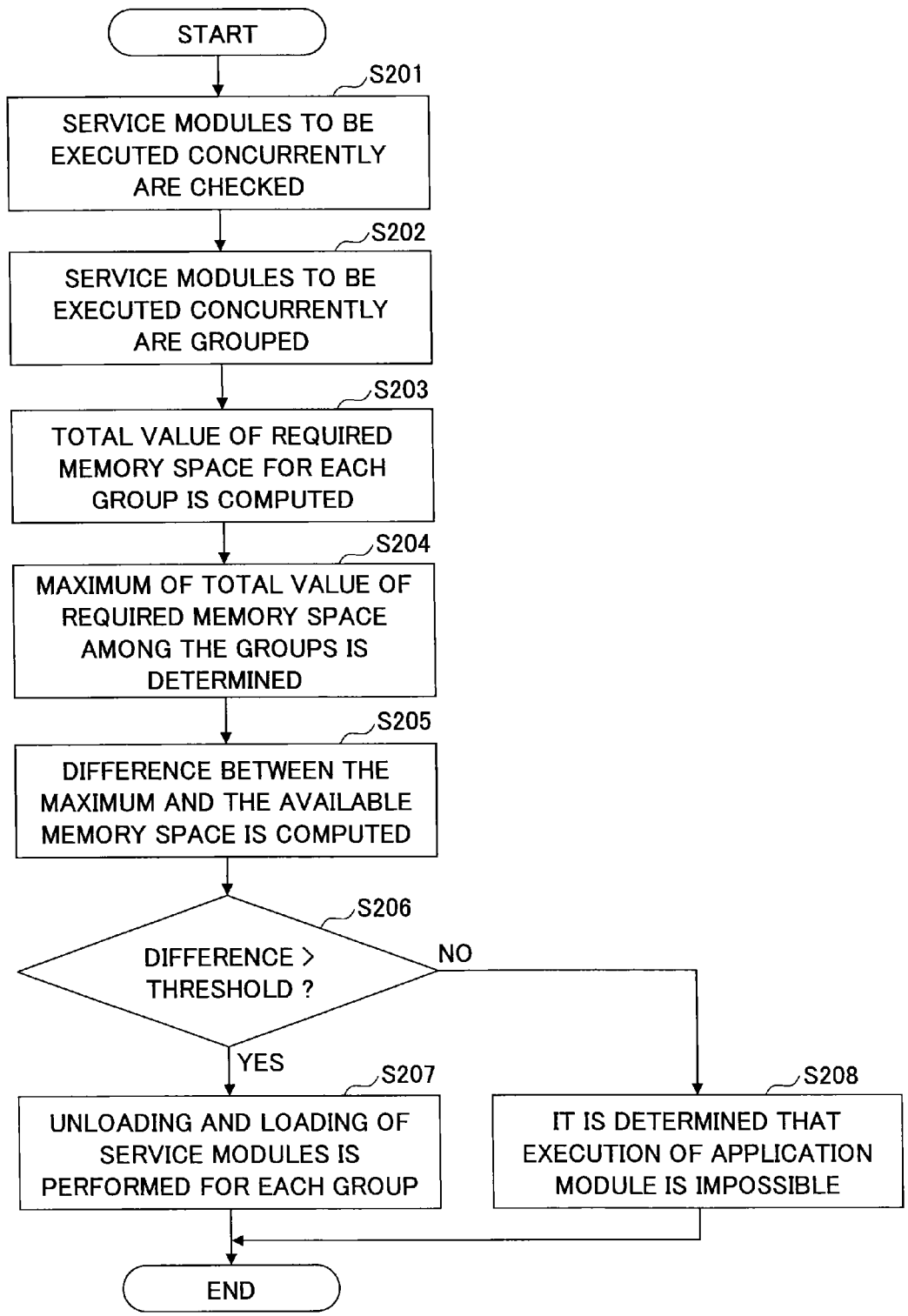
FIG. 9 is a flowchart for explaining the process performed by the connection manager when the available memory space is insufficient.

FIG. 9 is a flowchart for explaining the process performed by the connection manager in case of insufficient memory space.

As shown in FIG. 9, in step S201, the connection manager 13 checks the service modules to be executed concurrently in the execution condition information of each service module 12 selected as an object of use (S201). The connection manager 13 classifies the service modules 12 to be executed concurrently into groups (S202). The term "concurrently" means that the service modules 12 are to be executed almost at the same timing or in parallel with each other. The application module 14 may notify to the connection manager 13 the service modules to be executed concurrently. For example, the information indicating the service modules 12 to be executed concurrently may be contained as a part of the use function information. In this case, the service modules to be executed concurrently may not be contained in the execution condition information.

Subsequently, the connection manager 13 computes a total value of the available memory space in the execution condition information of the service modules 12 for every group (S203).

Subsequently, the connection manager 13 determines a maximum of the total value of the available memory space among the groups by comparing the respective total values computed for the groups (S204).

Subsequently, the connection manager 13 computes a difference between the available memory space in the current execution environment and the maximum computed at the step S204 (=the available memory space−the maximum) (S205).

Then, the connection manager 13 determines whether the difference is larger than a predetermined threshold (S206).

When it is determined at the step S206 that the difference is larger than the threshold, the connection manager 13 performs the loading and unloading of service modules 12 to the RAM 103 for every group in accordance with the progress of the processing of the application module 14 (S207).

Specifically, when a function use request from the application module 14 is received, the connection manager 13 loads a service module 12 corresponding to the function concerning the use request and other service modules 12 belonging to the group that is the same as that of the service module 12 on the RAM 103. Each of the thus loaded service modules 12 performs its processing. When the processing is completed and a timing at which the service module 12 can be unloaded is reached, the service module 12 notifies the connection manager 13 of the end of the processing. When the processing end notices from all the service modules 12 belonging to the same group are received, the connection manager 13 unloads all the service modules 12 belonging to the same group.

Repeating such processing enables the connection manager 13 to validate execution of the application module 14 while reducing the amount of the memory consumed at a time. The unloaded service module 12 may be loaded again, if needed, when a function use request from the application module 14 is received again.

On the other hand, when it is determined at the step 206 that the difference is not larger than the threshold, the connection manager 13 determines that execution of the application module 14 is impossible S208.

The threshold used at the step S113 of FIG. 8 and the step S206 of FIG. 9 means a margin or allowable value with respect to the amount of the memory used by the service module 12. It is not necessary that the threshold is always constant. Namely, when the application module 14 is performed actually, not only the application module 14 but also the service module 12 uses the memory. Therefore, it is preferred that the amount of the memory used by the application module 14 be taken into consideration when performing the selection process of service module 12.

However, the amount of the memory used by the application module 14 varies depending not only on the specification of the application module 14 but also on the actual operating condition. For example, even when the same application module 14 is executed, the amount of the memory used in a case of scanning an A3 document at 600 dpi is different from the amount of the memory used in a case of scanning an A4 document at 200 dpi. Therefore, the use of a fixed threshold in the service module selection process may cause a problem that the performance of the application module 14 cannot be fully demonstrated.

In order to eliminate the problem, the image forming device of the invention may be arranged so that the connection manager 13 always measures the available memory space during execution of the application module 14, and updates dynamically the threshold based on the result of the measurement.

The updating of the threshold may be performed at a timing that the threshold is used actually. In such a case, it is not necessary to always measure the available memory space, and the threshold may be updated based on the available memory space at the timing that the threshold is used.

Even when the connection manager 13 determines that execution of the application module is possible, an error of insufficient memory space may occur if a fixed threshold is used. However, updating dynamically the threshold enables the value of the threshold to be increased in such a case. The margin of the memory amount for operation of the application module 14 can be enlarged, and occurrence of an error of insufficient memory space can be prevented.

When initiation of an application module 14 is requested in the state where one or more application modules 14 are already performed, the process of FIG. 7 may be performed again for the in-progress application modules 14, in order to change dynamically the service modules 12 selected as objects of use, by taking into consideration the amount of the memory resources used by the newly started application module 14.

Specifically, when the connection manager 13 determines, during search of service modules 12 corresponding to the newly started application, that the available memory space is insufficient with any service module 12, the connection manager 13 selects a service module 12 having a smaller memory consumption (that is, the value of the available memory space in the execution condition information is relatively small), or a service module 12 which is specified as of memory saving priority in the execution condition information and includes all the use functions of the in-progress application modules as an object of use for the newly started application module. Accordingly, it is possible for the thus modified image forming device to perform a plurality of application modules 12 efficiently.

Meanwhile, the provision function information, the execution condition information, and the use function information are not limited to the composition in the above-described embodiment (FIG. 3, FIG. 4, etc.). For example, the provision function information and the execution condition information may be stored collectively as one information item (which information will be called "service module information") in a single file having the following composition.

FIG. 10 is a diagram showing a first example of service module information. As shown in FIG. 10, the service module information includes service ID, provision function information, and execution condition information.

The provision function information contains a class and an attribute. The class denotes the class of function and is equivalent to the major class in the example of FIG. 3. The attribute corresponds to the middle class or the minor class in the example of FIG. 3, but the composition of the attribute varies depending on the class.

The service module information of FIG. 10 corresponds to a scan function, and the "scan" is specified as the class. The attribute is constituted in accordance with the setup information of the scan function.

On the other hand, the execution condition information in the service module information of FIG. 10 contains a use memory and a performance.

The use memory corresponds to the available memory space in the example of FIG. 4. The performance is an index indicating the performance of a corresponding function (scan function), and the unit of the performance varies depending on a corresponding function. In a case of the scan function, the number of scanned sheets per second is selected as the unit of the performance.

FIG. 11 is a diagram showing a second example of service module information. The example of FIG. 11 represents the service module information of a service module 12 which has a same scan function but includes an attribute value and a performance value of execution condition information different from in the example of FIG. 10.

FIG. 12 is a diagram showing a third example of service module information. The example of FIG. 12 represents the service module information of a service module 12 which has a different function (print function). The class of the service module information of FIG. 12 is "print". The attribute has the composition corresponding to the print function.

In correspondence to the above-mentioned service module information, the use function information associated with the application module 14 may be arranged in the following composition. FIG. 13 is a diagram showing an example of use function information.

In the example of FIG. 13, the use function information includes a list of use functions, a list of attribute items for every use function, and a list of use attribute values for every attribute item. The class of functions used by a corresponding application module 14 is indicated by the list of use functions. The attribute values used by a corresponding application module 14 are indicated by the list of use attribute values.

Even in the case where the provision function information, the execution condition information, and the use function information are changed to the composition as shown in FIGS. 10 to 13, the process performed by the connection manager 13 may be substantially the same as described above.

Namely, what is necessary for the above-mentioned case is just to change the loop process for all the major classes in the steps S102-S108 of FIG. 7 or FIG. 8 to the loop process for all the use functions in the use function information of FIG. 13. What is necessary is just to change the step S103 of FIG. 7 or FIG. 8 to the step which searches a service module 12 which can respond to the use function and use attribute value specified in the use function information of FIG. 13 based on the class and the attribute of the provision function information in the service module information of FIG. 10. What is necessary is just to change the step which uses the "available memory space" in FIG. 4 to the step which uses the "use memory" in FIG. 10. Moreover, what is necessary is just to change the step which uses the "speed priority" in FIG. 4 to the step which uses the "performance" in FIG. 10.

For example, when the process of FIG. 8 is performed by using FIGS. 10 to 13, the service modules 12 which meets the scan function (FIG. 13) requested by the application module 14 are the service module 12 with service ID=0x00010001 (FIG. 10) and the service module 12 with service ID=0x00010002 (FIG. 11) (S103). In the step S104 in this case, the service module 12 of ID=0x00010002 which has a smaller memory usage is also selected. However, if the available memory space has a margin and the step S115 is performed, the service module 12 of ID=0x00010001 with sufficient performance is finally selected as an object of use.

As mentioned above, according to the image forming device 10 in this embodiment, the interface which is provided to the application module 14 is the same, but two or more service modules 12 which are specialized for the execution environment are provided. The request from the application module 14, the functions provided by the service modules 12, and the situation of the execution environment are judged. And a suitable service module 12 can be associated with the application module 14, and therefore the application module 14 is enabled to use the functions provided by the suitable service module 12.

In this case, the service modules 12 which are not used are not loaded on the RAM 103, and the amount of the memory consumed at a time can be reduced.

If the need of acquiring a log of the application module 14 arises from a viewpoint of security, the outputting of the log is attained by replacing the service module 12 by the service module 12 which outputs a log, without changing the application module 14.

The actual use state of the function provided by the service module 12 may be used as a criterion of judgment for selecting the service module 12. Specifically, the log ("use state log") which is indicative of the use frequency of the function (method) actually used by the application module 14 among the functions provided by the service module 12 is stored in the HDD 105. The information recorded in the use state log may be a total value of the use frequency or an average of the number of uses over a fixed period of time.

When a multi-function service module 12 is installed but there are very few possibilities of using all the functions provided by the service module 12 in a specific model or application module 14, it shows that the memory resources are vainly used. In such a case, the service module 12 equivalent to the subset version of service module 12 of a standard version in which only the specific function is mounted is installed, and the provision function information is registered to the connection manager 13. If the connection manager 13 determines the use state of the function (method) of the service module 12 based on the use state log and determines that it is enough with the subset version (or, if the function concerning the provision function information in the subset version meets the use functions derived from the use state log), the replacement of multi-function service module 12 by the subset version may be performed. In such a case, the standard service module 12 (the full-set version) being replaced is not loaded on the RAM 103. However, it exists in the ROM 103 or the HDD 105. If using the function not included in the subset version is requested by the application module 14, the subset version may be replaced again by the full-set version at that time.

Figure 14:
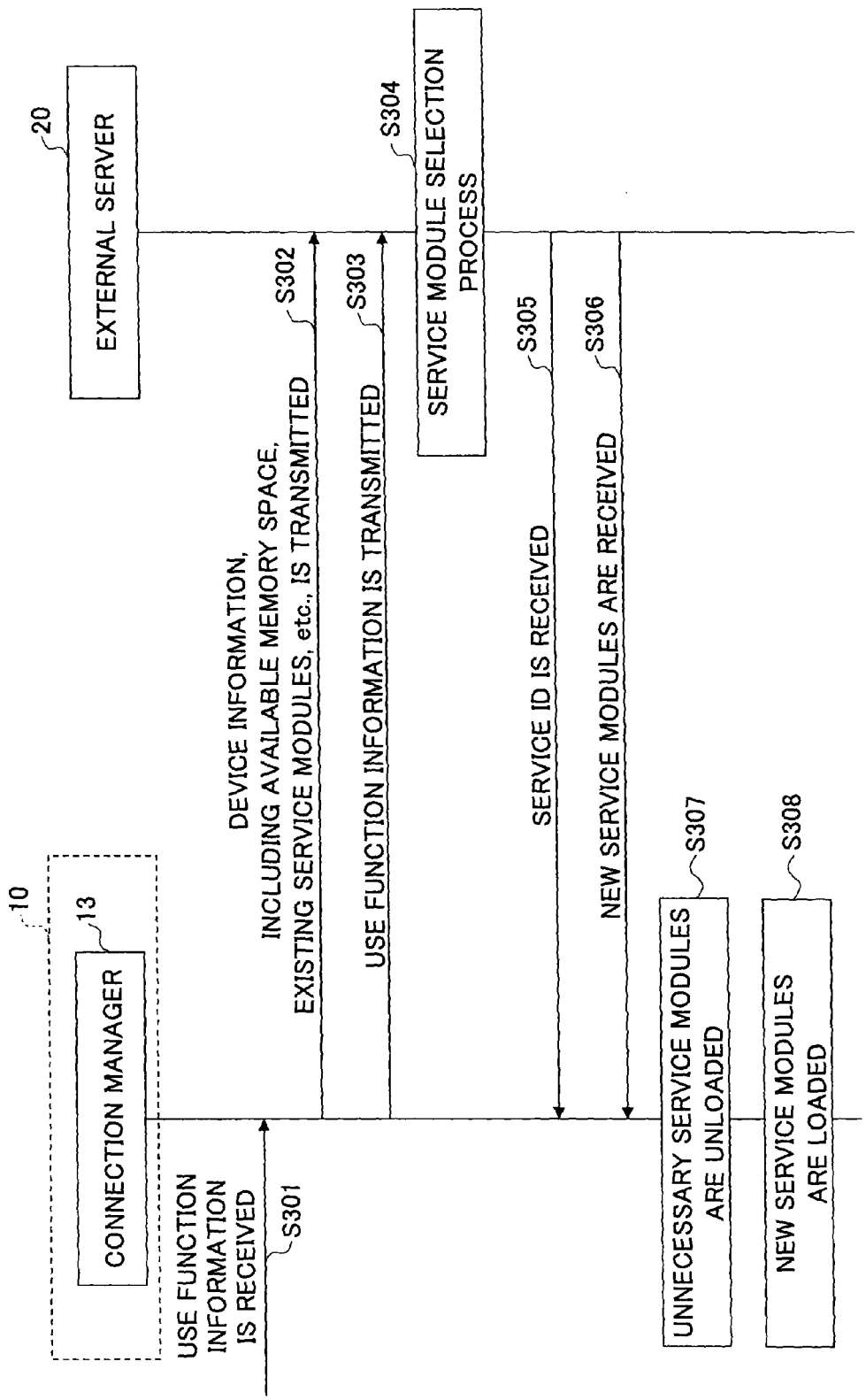
FIG. 14 is a sequence diagram for explaining the process performed by the connection manager when a service module selection process is performed by an external server.

The selection process of service module 12 may be performed by an external computer (or external server) which is connected to the image forming device 10 via a network. FIG. 14 is a sequence diagram for explaining the process performed by the connection manager when a service module selection process is performed by an external server.

With reference to FIG. 14, suppose that the external server 20 has a program which, when executed by a CPU of the external server 20, causes the CPU to perform the process of FIG. 7 or FIGS. 8 and 9, and this program is stored in a HDD of the external server 20. Moreover, suppose that the external server 20 has the provision function information, the execution condition information, and the substance (programs) of various service modules 12 which are stored in the HDD.

As shown in FIG. 14, when the use function information from the application module 14 is received at the connection manager 13 (S301), the connection manager 13 transmits to the external server 20 the device information relevant to the hardware resources (CPU, memory, etc.) of the image forming device 10, required for the service module selection process, and the information relevant to the current execution environment of the image forming device 10, including the available memory space, the service IDs of the already loaded service modules 12, etc. (S302).

The connection manager 13 transmits the received use function information to the external server 20 (S303).

Then, the external server 20 performs the service module selection process (the process of FIG. 7 or FIGS. 8 and 9) based on the received information (S304).

Subsequently, the external server 20 returns the service IDs of the service modules 12, which are selected as objects of use in the image forming device 10, to the connection manager 13 (S305).

If there are some service modules 12 among the already loaded service modules 12 which are no longer necessary after the new service modules 12 selected as the objects of use are loaded onto the RAM 103, the external server 20 returns the service IDs of such service modules 12 also to the connection manager 13.

Subsequently, the external server 20 transmits to the connection manager 13 the substance of the new service modules 12 selected as the objects of use (S306). Then, the connection manager 13 installs the received new service modules 12 into the image forming device 10 and stores them in the HDD 105.

Subsequently, the connection manager 13 unloads the service modules 12 the service IDs of which were notified as being unnecessary (S307). Then, the connection manager 13 loads the new service modules 12 which were selected as the objects of use and received in the step S306, on the RAM 103 (S308).

According to such composition, the necessary service modules 12 from the external server 20 are received at the connection manager 13 at any time, and it is not necessary that all the service modules 12 are installed beforehand in the image forming device 10. Therefore, it is possible to prevent the HDD 105 or the ROM 104 of the image forming device 10 from running short of the available storage amount. Selection and loading of the service modules performed in cooperation with the external server 20 is effective and allows the newest update of the service modules 12 for the purpose of fault correction, etc. to be received at the connection manager 13 at any time.

The connection manager 13 may be arranged so that, after the function using process of the application module 14 is completed, the connection manager 13 deletes from the HDD 105 the service modules 14 which were received in accordance with the function use request from the application module 14.

The present invention is not limited to the above-described embodiments, and variations and modifications may be made without departing from the scope of the present invention.

What is claimed is:

1. An electronic device which includes hardware resources providing a plurality of functions of the electronic device, and software modules, the electronic device comprising:
processing circuitry configured to implement:
an application program which uses one or more of the plurality of functions through one or more of a plurality of application programming interfaces;
a plurality of service modules executed on a software platform, each service module providing one of the plurality of application programming interfaces for enabling the application program to use a function of the plurality of functions of the electronic device; and
a connection manager configured to:
receive use function information indicating the function of the electronic device and two or more attributes corresponding to the function of the electronic device from the application program;
compare the received use function information to a plurality of provision function information corresponding to the plurality of service modules to identify a provision function information, among the plurality of provision function information, that also indicates the function and the two or more attributes indicated by the received use function information;
select a service module, from among the plurality of service modules, providing an application programming interface through which the function is used by the application program based on the identified provision function information; and
in response to selecting two or more service modules based on a result of the comparison of the use function information and the plurality of provision function information, select one of the two or more service modules based on a result of comparison of information indicating an execution environment of each of the two or more service modules with information indicating an execution environment of the electronic device,
wherein priority information, indicating each service module giving priority to memory saving or performance, is stored in a storage device and the connection manager selects the service module based on the priority information, and
wherein the function is one of a scan function, a print function, or a fax function.

2. The electronic device according to claim 1, wherein use state information indicating a use frequency of the plurality of functions used by the application program is stored in a storage device.

3. The electronic device according to claim 1, wherein the connection manager is configured to select the service module as an object of use for the application program based on the result of the comparison of the use function information stored in a storage device and indicating the function used by the application program with the plurality of provision function information stored in the storage device and indicating functions provided by the plurality of service modules.

4. The electronic device according to claim 1, wherein the information indicating the execution environment of each of the two or more service modules and the information indicating the execution environment of the electronic device include available memory space and central processing unit (CPU) performance.

5. The electronic device according to claim 1, wherein the connection manager is configured to receive the use function information from the application program in response to an execution instruction of the application program from a user.

6. An information processing method for use in an electronic device that includes processing circuitry, hardware resources providing a plurality of functions of the electronic device, and software modules, the method comprising:
executing, by the processing circuitry, an application program which uses one or more of the plurality of functions through one or more of a plurality of application programming interfaces;
arranging a plurality of service modules executed on a software platform, each service module providing one or more of the plurality of application programming interfaces for enabling the application program to use a function of the plurality of functions of the electronic device;
receiving use function information indicating the function of the electronic device and two or more attributes corresponding to the function of the electronic device from the application program;
comparing the received use function information to a plurality of provision function information corresponding to the plurality of service modules to identify a provision function information, among the plurality of provision function information, that also indicates the function and the two or more attributes indicated by the received use function information;
selecting a service module, from among the plurality of service modules, providing an application programming interface through which the function is used by the application program based on the identified provision function information; and
in response to selecting two or more service modules based on a result of the comparison of the use function information and the plurality of provision function information, selecting one of the two or more service modules based on a result of comparison of information indicating an execution environment of each of the two or more service modules with information indicating an execution environment of the electronic device,
wherein priority information, indicating each service module giving priority to memory saving or performance, is stored in a storage device and the service module is selected based on the priority information, and
wherein the function is one of a scan function, a print function, or a fax function.

7. The information processing method according to claim 6, wherein use state information indicating a use frequency of the plurality of functions used by the application program is stored in a storage device.

8. The information processing method according to claim 6, wherein the service module is selected as an object of use for the application program based on the result of the comparison of the use function information stored in a storage device and indicating the function used by the application program with the plurality of provision function information stored in the storage device and indicating functions provided by the plurality of service modules.

9. The information processing method according to claim 6, wherein the information indicating the execution environment of each of the two or more service modules and the information indicating the execution environment of the electronic device include available memory space and central processing unit (CPU) performance.

10. A non-transitory computer-readable storage medium having stored thereon a computer-readable program which, when executed by an electronic device that includes processing circuitry, hardware resources providing a plurality of functions of the electronic device, and software modules, causes the electronic device to perform an information processing method, the method comprising:
   executing an application program which uses one or more of the plurality of functions through one or more of a plurality of application programming interfaces;
   arranging a plurality of service modules executed on a software platform, each service module providing one or more of the plurality of application programming interfaces for enabling the application program to use a function of the plurality of functions of the electronic device;
   receiving use function information indicating the function of the electronic device and two or more attributes corresponding to the function of the electronic device from the application program;
   comparing the received use function information to a plurality of provision function information corresponding to the plurality of service modules to identify a provision function information, among the plurality of provision function information, that also indicates the function and the two or more attributes indicated by the received use function information;
   selecting a service module, from among the plurality of service modules, providing an application programming interface through which the function is used by the application program based on the identified provision function information; and
   in response to selecting two or more service modules based on a result of the comparison of the use function information and the plurality of provision function information, selecting one of the two or more service modules based on a result of comparison of information indicating an execution environment of each of the two or more service modules with information indicating an execution environment of the electronic device,
   wherein priority information, indicating each service module giving priority to memory saving or performance, is stored in a storage device and the service module is selected based on the priority information, and
   wherein the function is one of a scan function, a print function, or a fax function.

11. The non-transitory computer-readable storage medium according to claim 10, wherein use state information indicating a use frequency of the plurality of functions used by the application program is stored in a storage device.

12. The non-transitory computer-readable storage medium according to claim 10, wherein the service module is selected as an object of use for the application program based on the result of the comparison of the use function information stored in a storage device and indicating the function used by the application program with the plurality of provision function information stored in the storage device and indicating functions provided by the plurality of service modules.

13. The non-transitory computer-readable storage medium according to claim 10, wherein the information indicating the execution environment of each of the two or more service modules and the information indicating the execution environment of the electronic device include available memory space and central processing unit (CPU) performance.

* * * * *